Feb. 7, 1967 R. WAKAR 3,302,450
DEVICE FOR TESTING TUBES FOR LEAKS
Filed Jan. 31, 1964

Inventor
ROMUALD WAKAR
By Philip M. Bolton
Attorney 3,302,450
DEVICE FOR TESTING TUBES FOR LEAKS
Romuald Wakar, London, England, assignor to International Standard Electric Corporation, New York, N.Y., a corporation of Delaware
Filed Jan. 31, 1964, Ser. No. 341,582
Claims priority, application Great Britain, Feb. 27, 1963, 7,900/63
4 Claims. (Cl. 73—45.5)

This invention relates to the manufacture of tubes and is particularly concerned with a method of testing for holes or leaks in the walls of tubes such as the inner conductor of a submarine cable.

The tubular inner conductor of a submarine cable is usually surrounded by extruded insulation and the heat necessary to extrude the insulation causes air bubbles to escape through any very small cracks or pinholes which may be present in the tubular inner conductor and become trapped in the extruded insulation. These cracks or pinholes may be hardly visible under a magnifying glass and are unlikely to be detected by known methods. It has now been found, according to one aspect of the present invention, that these cracks or pinholes can be detected by simulating the effect created by the heat necessary to extrude the insulation.

According to the present invention there is provided a method of testing tubes which includes the steps of submerging a portion of a tube containing a gas in a liquid which partially fills a closed vessel, reducing the pressure of a gas which fills the remainder of the vessel below the pressure of the gas inside the tube, and detecting any escape of the gas from the inside of the tube through the liquid.

In the accompanying drawings, which illustrate embodiments of the present invention:

Figure 1:
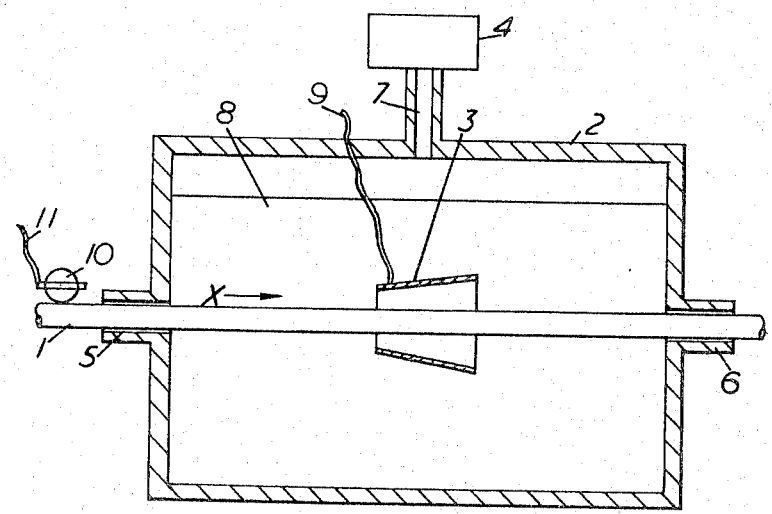
FIG. 1 is a longitudinal sectional view of an apparatus for detecting holes in the walls of a tubular electrical conductor during its manufacture.

Referring to FIG. 1 there is shown a tank 2 having an entry gland 5, an exit gland 6, and a port 7 connected to the inlet of an air pump 4. The tank 2 is partially filled with liquid such as trichlorethylene 8, and has a tubular electrode 3 insulatingly supported within it by means not shown. A tubular electrical conductor 1 is shown passing through the entry gland 5, the electrode 3, and the exit gland 6 in the direction of the arrow X. Electrical connection is made to the conductor 1 through a contact wheel 10 and a lead 11, and to the electrode 3 by means of an insulated lead 9 passing through a hole in the tank 2. The leads 9 and 11 are connected to the terminals of a capacitance bridge (not shown) which is balanced using the capacitance between them via the conductor 1, trichlorethylene 8 and electrode 3 as one arm of the bridge.

In operation the air pump 4 is started and the air in the tank 2 removed until the pressure in it is in the region of 260 to 110 mm. of mercury. Any holes which may exist in the conductor 1 may be detected by the escape of air bubbles into the trichlorethylene, and to enable this detection to be made automatically the bridge is balanced with the conductor 1 stationary and while no bubbles are escaping. The conductor 1 is then moved in the direction of the arrow X and when a point at which bubbles of air escaping from the conductor 1 reaches the electrode 3 the bubbles cause a change in the capacitance between the electrode 3 and the conductor 1 and cause the bridge to be unbalanced. This unbalance may be used to operate a visual or audible alarm.

In a simpler embodiment of the present invention the bridge network and tubular electrode may be omitted and the bubbles seen through a glass window in the side of the tank 2.

Instead of trichlorethylene it is possible to use any other liquid which will not affect either any insulation that may be subsequently applied to the conductor 1, or the conductor, and which has a relatively low viscosity and a reasonably high boiling temperature under the reduced pressure at which the apparatus functions. For example, glycol, water or glycerol would be suitable.

Preferably the conductor 1 is washed before entering the tank 2 to ensure that even the smallest hole in the conductor 1 is not blocked.

The tubular electrode 3 has a tapering bore with the smallest end nearest to the conductor entry gland 5 to prevent an accumulation of air bubbles between the electrode and the conductor.

In an alternative embodiment of the present invention using a different capacitance sensitive device changes in the capacitance between the electrode 3 and the conductor 1 are measured by making the capacity form part of an oscillator circuit and then detecting changes in capacitance by measuring changes in the frequency.

Figure 2:
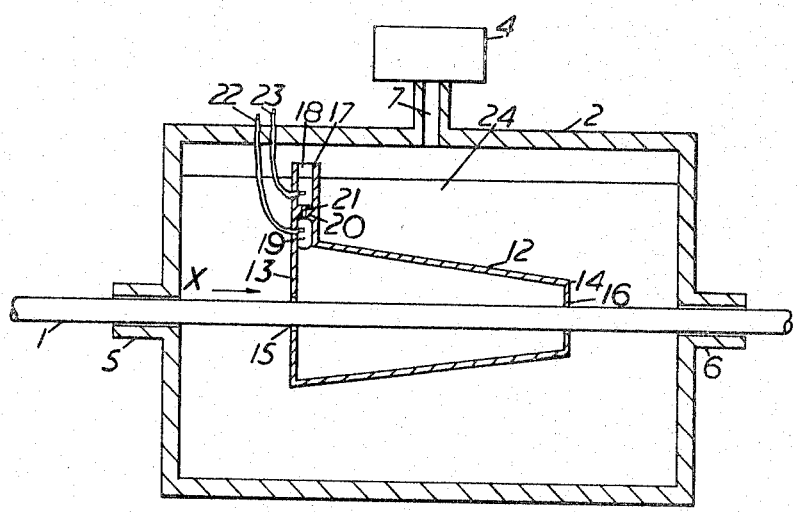
FIG. 2 is a longitudinal sectional view of an alternative apparatus to that shown in FIG. 1.

Referring to FIG. 2 in which similar parts to those shown in FIG. 1 are given the same reference numerals and require no further explanation. The tubular electrode 3 (FIG. 1) is replaced by a compartment 12 having end walls 13 and 14 and an outlet 17. The end walls 13 and 14 have openings 15 and 16 respectively through which the conductor 1 may slide.

The outlet 17 is divided into two compartments 18 and 19 by a web 20. The web 20 has a passage 21 of small bore which joins the compartments 18 and 19. The outlet 17 and web 20 are manufactured from an electrical insulating material.

The tank 2 is filled with electrically conducting water 24 until a portion of the compartment 18 remains above the level of the water 24.

The outlet 17 has two insulated electrical conductors 22 and 23 which extend through the walls of the compartments 18 and 19 and have their conductor ends exposed to the liquid, the conductor ends being separated by the web 20. The insulated conductors 22 and 23 are connected to the terminals of a resistance bridge (not shown) which is balanced using the resistance from insulated conductor 22 to insulated conductor 23 via the water in the passage 21 as one arm of the bridge.

In operation air pump 4 is started and the air in the tank 2 is removed until the pressure in it is in the region of 110 to 260 mm. of mercury. The conductor 1 is moved in the direction of arrow X and any holes in the conductor will cause air bubbles to escape in the water 24. When a hole in the conductor 1 enters the compartment 12 the bubbles escaping from it are trapped between the end walls 13 and 14 and are directed into the outlet 17.

As the bubbles rise in the outlet 17 they pass through the passage 21 and either completely interrupt the electrical circuit through the water between the insulated conductors 22 and 23 or considerably increase its electrical resistance, thus unbalancing the resistance bridge. Any unbalance of the resistance bridge can be made to actuate a visual or audible warning device.

If desired the web 20 may be omitted because the air bubbles through the outlet 17 will still cause an increase in the electrical resistance. The web 20 merely increases the change in the electrical resistance of the circuit when air bubbles are present in a constriction in the bore of the outlet which in this embodiment is the passage 20.

In some instances it may be desirable to seal the conductor 1 in the openings 15 and 16 by glands so that full vacuum differential appears between the compartments 18 and 19.

It is essential that the electrical circuit between the bared ends of the condutcors 22 and 23 can only be closed via the liquid in the passage 21.

It is not essential for the exposed end of the insulated conductor 22 to be in the compartment 19. It can be inserted anywhere in the water 24 other than in compartment 18.

The vacuum may be of other magnitude than stated previously provided that it draws air from a hole in the conductor 1.

The resistance bridge may be replaced by any resistance sensitive device, for example, it may be replaced by a relay, the grid circuit of a vacuum tube or an ohmmeter.

The compartment 12 may be any shape which causes bubbles to collect at the outlet 17 which may be situated anywhere along the length of the compartment 12.

The water 24 may be replaced by any electrically conducting liquid which does not adversely affect the conductor for example, a solution of common salt in water.

Embodiments of the present invention other than that shown in FIG. 1 may be used for detecting holes in any types of tubes which need not necessarily be of metal.

It is to be understood that the foregoing description of specific examples of this invention is not to be considered as a limitation on its scope.

What I claim is:

1. Apparatus for testing tubular members comprising, a closed vessel adapted to be partially filled with liquid, an inlet gland and an outlet gland through the walls of said vessel positioned to be below the level of said liquid, a first tubular member extending through said vessel supported between said glands and being submerged in said liquid, the inner portion of said tubular member containing a gas therein, a vacuum source connected to the vessel above the liquid level, a second member submerged in said liquid positioned to surround a portion of said first member and enclose a portion of said liquid, and means for sensing impedance changes in the liquid within said second member resulting from gas escaping through said portion of said first member.

2. The apparatus of claim 1 wherein a capacitance change sensing device is connected between said first and second members.

3. The apparatus of claim 1 wherein a resistance change sensing device is connected between two different portions of the liquid within said second member, said second member having an outlet directing gas escaping through said first member past said two different portions.

4. The apparatus of claim 3 wherein one portion of said outlet extends above said liquid level and including a constriction in said outlet separating said two liquid portions.

References Cited by the Examiner
UNITED STATES PATENTS

| | | | |
|---|---|---|---|
| 2,264,515 | 12/1941 | Fear | 73—46 |
| 3,114,257 | 12/1963 | Foster et al. | 73—45.5 |

LOUIS R. PRINCE, *Primary Examiner.*

S. C. SWISHER, *Assistant Examiner.*